United States Patent
Zoppas et al.

(10) Patent No.: US 12,441,386 B2
(45) Date of Patent: Oct. 14, 2025

(54) HEATING AND DETECTING DEVICE FOR DETECTING A CONTACT BETWEEN A USER AND A STEERING WHEEL OF A VEHICLE, AND FOR HEATING THE STEERING WHEEL

(71) Applicant: I.R.C.A. S.P.A. INDUSTRIA RESISTENZE CORAZZATE E AFFINI, Vittorio Veneto (IT)

(72) Inventors: Federico Zoppas, Treviso (IT); Mauro Berioli, Vittorio Veneto (IT)

(73) Assignee: I.R.C.A. S.P.A. INDUSTRIA RESISTENZE CORAZZATE E AFFINI, Vittorio Veneto (IT)

( * ) Notice: Subject to any disclaimer, the term of this patent is extended or adjusted under 35 U.S.C. 154(b) by 1073 days.

(21) Appl. No.: 17/296,070

(22) PCT Filed: Dec. 4, 2019

(86) PCT No.: PCT/IB2019/060422
§ 371 (c)(1),
(2) Date: May 21, 2021

(87) PCT Pub. No.: WO2020/115670
PCT Pub. Date: Jun. 11, 2020

(65) Prior Publication Data
US 2022/0009539 A1    Jan. 13, 2022

(30) Foreign Application Priority Data

Dec. 4, 2018 (IT) ........................ 102018000010784

(51) Int. Cl.
*B62D 1/06* (2006.01)
*B62D 1/04* (2006.01)

(52) U.S. Cl.
CPC ............... *B62D 1/06* (2013.01); *B62D 1/046* (2013.01)

(58) Field of Classification Search
CPC ........... B62D 1/046; B62D 1/06; B62D 1/065
(Continued)

(56) References Cited

U.S. PATENT DOCUMENTS 4,631,976 A * 12/1986 Noda ...................... B62D 1/065
74/552
6,333,736 B1 * 12/2001 Sandbach ............... G06F 3/045
178/18.05

(Continued)

FOREIGN PATENT DOCUMENTS

WO    2013/087408 A2    6/2013

*Primary Examiner* — Steven W Crabb
*Assistant Examiner* — Ket D Dang
(74) *Attorney, Agent, or Firm* — Amster, Rothstein & Ebenstein LLP

(57) ABSTRACT

Device (100) for a system for detecting a contact between a user and a steering wheel (9) of a vehicle, and for heating the steering wheel (9). The device includes an electrically insulating support (10); a first track (1) for heating the steering wheel (9), a second track (2) for detecting the contact, and a third track (3) for avoiding the detection of false contacts. The first track (1), the second track (2) and the third track (3) are electrically conductive, distinct from one another and arranged on the same surface of the electrically insulating support (10), wherein the third track (3) is arranged between the first track (1) and the second track (2).

13 Claims, 4 Drawing Sheets

(58) Field of Classification Search
USPC .......................................................... 219/204
See application file for complete search history.

(56) References Cited

U.S. PATENT DOCUMENTS

| | | | | |
|---|---|---|---|---|
| 11,349,063 | B2* | 5/2022 | Han | G01L 1/16 |
| 2014/0253151 | A1* | 9/2014 | Kandler | B60N 2/0035 |
| | | | | 324/686 |
| 2015/0336601 | A1* | 11/2015 | Van'tZelfde | B62D 1/046 |
| | | | | 307/9.1 |
| 2017/0137050 | A1* | 5/2017 | Michelmann | B62D 1/06 |
| 2019/0036527 | A1* | 1/2019 | Dolcetti | B62D 1/065 |

\* cited by examiner

HEATING AND DETECTING DEVICE FOR DETECTING A CONTACT BETWEEN A USER AND A STEERING WHEEL OF A VEHICLE, AND FOR HEATING THE STEERING WHEEL

CROSS REFERENCE TO RELATED APPLICATIONS

This application claims benefit under 35 U.S.C. § 371 to international application No. PCT/IB2019/060422 filed on Dec. 4, 2019, which claims priority to Italian application No. 0201800001078 filed Dec. 4, 2018, the contents of which are incorporated by reference in their entireties.

FIELD OF THE INVENTION

The present invention relates to a device or component for detecting the contact between a user's hand or hands and the steering wheel of a vehicle, and for heating the steering wheel. The invention in particular relates to a device or component which is applied to the steering wheel.

BACKGROUND ART

A particularly useful function in the automotive field is the detection of the contact between the driver's hand or hands and the steering wheel. A component provided with an electrically conductive track adapted to operate as contact sensor may be used for this purpose. When the track is connected to an electronic control unit, the latter may indeed process a variation of an electrical quantity, for example a variation of capacitance. Such a variation is induced by the contact, which may also be of indirect type, of the hand with the conductive track which is arranged on the steering wheel. The conductive track may for example, be arranged under an outer covering layer of the steering wheel.

Another particularly useful function is the heating of the steering wheel of a vehicle. A component provided with an electrically conductive track which is heated due to the Joule effect may be used for this purpose.

Disadvantageously, when both a heating track and a sensor track are used, interference problems between the two tracks are encountered, in particular capacitive couplings and electromagnetic interferences in general. These interferences in particular occur when the heating track is operating.

It indeed occurs that the sensor track detects "false contacts" or "false touches", i.e. a contact with the hand is detected when in reality such a contact did not occur.

In addition to the interference between the two tracks, the false contacts may also be caused by other factors.

Indeed, certain environmental factors, among which humidity and temperature, typically introduce an increase of the capacitance which the electronic control unit erroneously interprets as a contact with the hand, also when the driver is not touching the steering wheel.

For example, when there is strong humidity, water drops may be formed on the steering wheel, the drops introducing a capacitance called parasitic capacitance. The parasitic capacitance generated by the water drops could have a comparable value, i.e. similar, with the one of the capacitance which is generated when the driver's hand touches the steering wheel. The result is that the parasitic capacitance due to the water drops on the steering wheel is erroneously interpreted as a touch of the steering wheel.

Thus, a need is felt to overcome such drawbacks.

SUMMARY OF THE INVENTION

It is an object of the present invention to provide a device or component for a steering wheel which allows the detection of false contacts to be avoided or minimized.

It is another object of the present invention to provide such a device or component provided both with a heating track and with a sensor track, which allows interferences between the two tracks to be minimized or avoided, in particular interferences which induce false contacts.

The present invention achieves at least one of such objects and other objects which will be apparent in light of the present description, by means of a device for detecting a contact between a user and a steering wheel of a vehicle, and for heating the steering wheel, the device comprising:
  an electrically insulating support;
  a first track for heating the steering wheel, a second track for detecting the contact, and a third track for avoiding the detection of false contacts,
  the first track, the second track and the third track being electrically conductive, distinct from one another and arranged on the same surface of the electrically insulating support; wherein the third track is arranged between the first track and the second track.

According to one aspect, the invention also relates to a steering wheel of a vehicle provided with at least one device according to the claims below.

According to another aspect, the invention also relates to a method of operating a device according to the claims, wherein during the electric supply for heating the heating track, the third track shields the second track so as to avoid a capacitive coupling between the first track and the second track, and optionally wherein the second track and the third track are arranged at the same electric potential.

The device advantageously may be applied to a steering wheel. The device in particular may be fastened to the steering wheel and be arranged under an outer covering layer of the steering wheel, made of leather for example.

The first track, the second track and the third track are also called heating track, sensor track and shielding track, respectively.

Due to the presence of the third track and to the specific positioning thereof with respect to the other tracks, the device of the invention advantageously allows the detection of false contacts due to interferences, in particular capacitive couplings or electromagnetic interferences in general between the heating track and the sensor track, to be avoided or minimized. The false contacts in particular can be avoided or minimized also when the heating track is operating.

Moreover, the heating track and the sensor track advantageously may be arranged at the same potential by means of an electronic control unit and the specific position of the three tracks on the same surface or face of the insulating support allows a possible water drop to be in contact or capacitive coupling both with the sensor track and with the shielding track. Thereby, the false contacts due to environmental factors such as humidity, are avoided or minimized. Given that the shielding track is provided, such a track and the sensor track advantageously may be arranged at the same potential in a continuous manner, without the need for interruptions. The heating by means of the heating track advantageously may also be carried out in continuous manner.

Moreover, by arranging the three tracks on a same surface of the insulating support, the device of the invention advantageously is particularly thin and may be easily manufactured.

The device advantageously also allows using two distinct electronic control units, in particular one for the heating track and one for the sensor track and the shielding track.

In any case, a single electronic control unit adapted to control the three tracks, i.e. the sensor track, the heating track and the shielding track, may be provided.

Further features and advantages of the invention will be more apparent in light of the detailed description of certain non-limiting embodiments.

Other embodiments of the invention are also set forth in the claims.

BRIEF DESCRIPTION OF THE DRAWINGS

Reference is made in the description of the invention to accompanying drawings, which are provided by way of a non-limiting example, in which.

The same references in the drawings identify the same elements or components.

DETAILED DESCRIPTION OF EMBODIMENTS OF THE INVENTION

Figure 1:
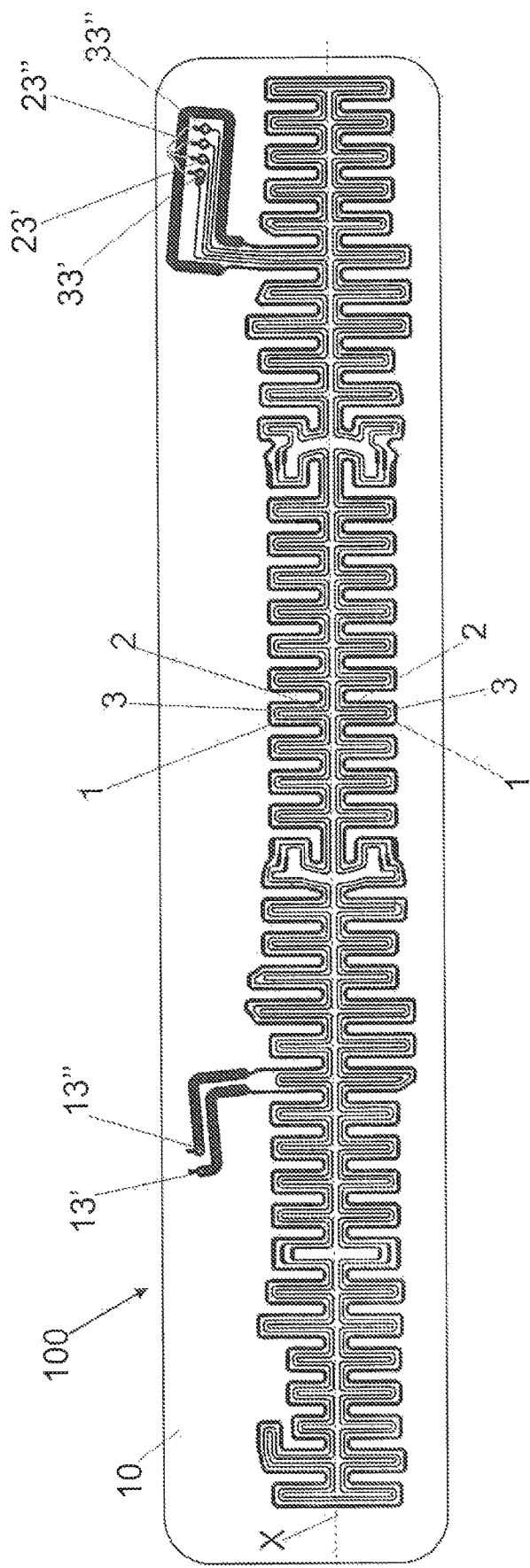
FIG. 1 shows a top plan view of a device according to the invention.

With reference to the drawings, there is described a device 100 for a system for detecting a contact between a user and a steering wheel 9 of a vehicle, and for heating the steering wheel 9.

Device 100 comprises an electrically insulating support 10; a heating track 1 (or first track) for heating the steering wheel 9, a sensor track 2 (or second track) for detecting the contact, and a shielding track 3 (or third track) for avoiding or minimizing the detection of false contacts. The shielding track 3 in particular allows avoiding or minimizing the interferences between the heating track 1 and the sensor track 2. Such interferences may be for example, capacitive couplings or electromagnetic interferences in general.

The heating track 1, the sensor track 2 and the shielding track 3 are electrically conductive, distinct from one another and fastened to support 10.

The three tracks 1, 2, 3 are arranged, in particular fastened, on a same surface of the insulating support 10. In greater detail, the three tracks 1, 2, 3 are placed side-by-side one another on said surface of the insulating layer 10. The three tracks 1, 2, 3 preferably are completely arranged on said surface of the insulating support 10. The three tracks 1, 2, 3 preferably are in direct contact with said surface of the insulating support 10.

The shielding track 3 is arranged between the heating track 1 and the sensor track 2, i.e. the shielding track 3 extends between the heating track 1 and the sensor track 2. For example, all, or substantially all, the shielding track 3 (i.e. for the whole, or substantially the whole, extension thereof in length along the axis thereof) extends between the heating track 1 and the sensor track 2; thereby, substantially all the parasitic capacitances along the sensor track 2 are filtered. The end portions of the shielding track 3 optionally do not extend between the tracks 1 and 2.

The three tracks 1, 2, 3 preferably extend for at least 50% of the extension in length thereof, for example between 70 and 100%, in parallel, or substantially parallel, manner with one another.

Figure 3:
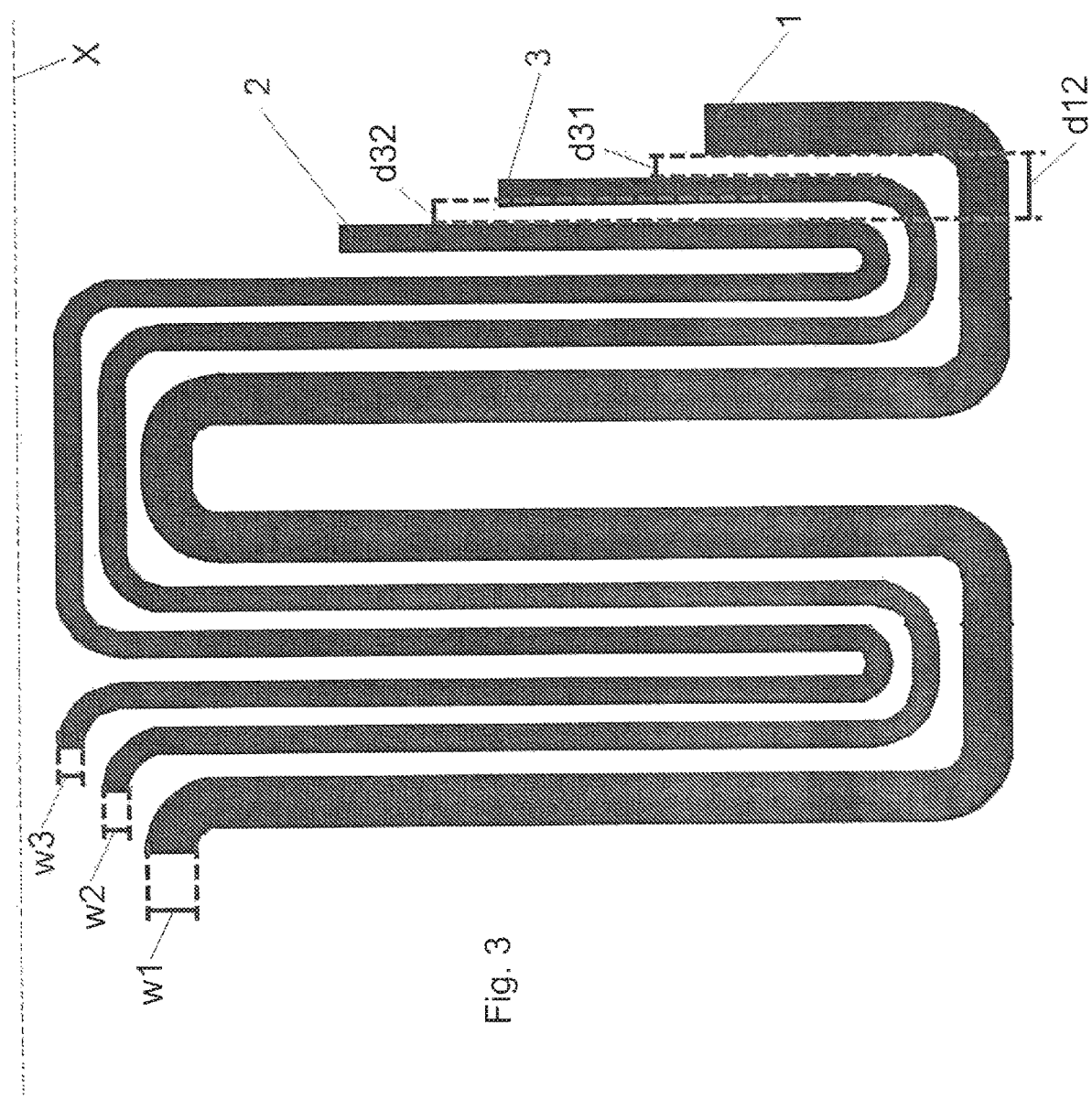
FIG. 3 shows a detail of FIG. 2.

The minimum distance "d12" (FIG. 3) between the heating track 1 and the sensor track 2 preferably is between 1.5 and 4 mm, or between 2.5 and 4 mm.

The shielding track 3 preferably is spaced apart both from the heating track 1 and from the sensor track 2. The shielding track 3 in particular is not in direct contact either with the heating track 1 or with the sensor track 2.

The minimum distance "d31" (FIG. 3) between the shielding track 3 and the heating track 1 preferably is between 0.1 and 1.5 mm.

The minimum distance "d32" (FIG. 3) between the shielding track 3 and the sensor track 2 preferably is between 0.1 and 1.5 mm.

The shielding track 3 preferably is equally spaced from, or about equally spaced from, the heating track 1 and from the sensor track 2.

Width w1 (FIG. 3) of the heating track 1 preferably is greater than width w2 of the sensor track 2 and of width w3 of the shielding track 3.

Width w1 of the heating track 1 preferably is between 0.5 and 4 mm.

Width w2 of the sensor track 2 preferably is between 0.5 and 2 mm.

Width w3 of the shielding track 3 preferably is between 0.5 and 2 mm.

In general, width of the track means the measurement taken parallel to the surface of support 10 and perpendicular to the axis of the track. Thickness of the track instead means the measurement taken perpendicular to the surface of support 10 and to the axis of the track.

Figure 2:
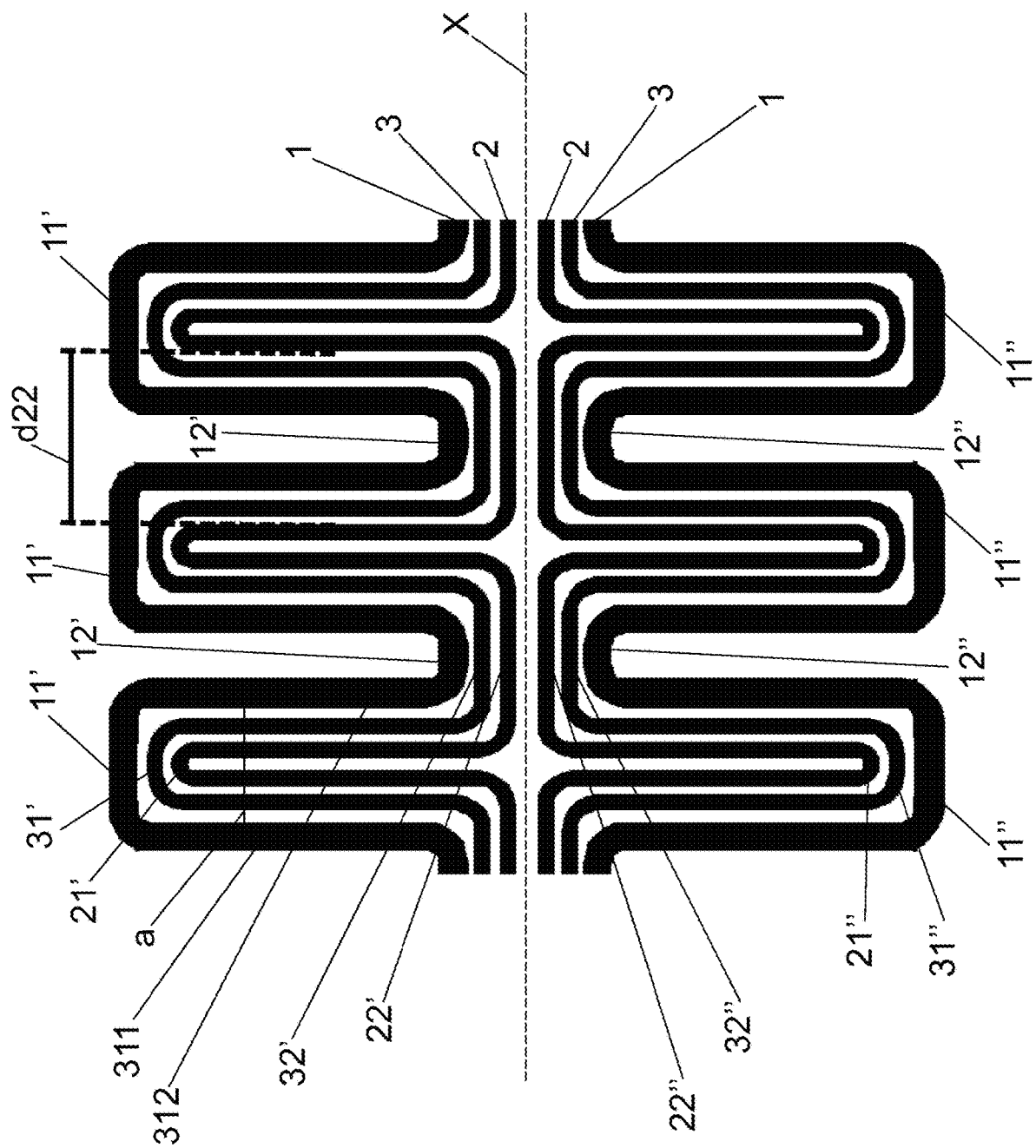
FIG. 2 shows a detail of FIG. 1.

With particular reference to FIG. 2, the three tracks 1, 2, 3 optionally each comprise a plurality of peaks 11', 21', 31' (or first peaks for descriptive purposes) alternated by respective troughs 12', 22', 32' (or first troughs) along axis X. Axis X is the longitudinal axis of device 100, for example. The peaks may also be called crests and the troughs may also be called valleys.

Each peak 11' of the heating track 1 preferably corresponds to a respective peak 21' of the sensor track 2 and a respective peak 31' of the shielding track 3, and similarly for the troughs 12', 22', 32'.

The peaks 11' of the heating track 1, the peaks 21' of the sensor track 2 and the peaks 31' of the shielding track 3 preferably are aligned with one another. In other words, it is preferable for each peak 11' to be aligned with a respective peak 21' and with a respective peak 31'. The troughs 12', 22', 32' preferably are aligned with one another in similar manner.

The minimum distance "d22" (FIG. 2), or gap, between the peaks 21' of the sensor track 2 preferably is between 10 and 18 mm. Such a distance preferably is parallel to axis X. All the peaks 21' preferably, but not exclusively, are spaced apart from one another by distance d22.

The width of a peak 11' is indicated with reference "a" (FIG. 2). Typically, the width of any peak is the minimum distance, in particular parallel to axis X, between the ascending stretch 311 and the descending stretch 312 of the peak.

The width "a" of each peak 11' preferably is greater than the width of the respective peak 31' with which it is aligned, and the width of each peak 31' is greater than the width of the respective peak 21' with which it is aligned. Such relations between the widths occur in particular when the heating track 1 is proximal to the periphery, or outer outline, of device 100, while the shielding track 3 and the sensor track 2 are more inward with respect to the heating track 1. In this case, the shielding track 3 and the sensor track 2 are within the perimeter defined by the heating track 1.

Alternatively, it may be provided for the sensor track 2 to be more outward, i.e. proximal to the periphery of the device, while the shielding track 3 and the heating track 1 are more inward with respect to the sensor track 2. In this case, each peak 21' of the sensor track 2 has a greater length with respect to peak 31' of the shielding track 3 with which it is aligned, and each peak 31' has a greater width with respect to peak 11' of the heating track 1 with which it is aligned.

Each of the three tracks 1, 2, 3 preferably also comprises further peaks 11", 21", 31" (also called second peaks for descriptive purposes), alternated by respective troughs 12", 22", 32" (or second troughs), in particular along an axis X.

The first peaks 11', 21', 31' and the second peaks 11", 21", 31" preferably extend, in particular in height, in opposite direction to one another, in particular along a respective direction which is transverse, preferably orthogonal, to axis X.

The first peaks 11', 21', 31' and the second peaks 11", 21", 31" preferably are aligned with one another, and the first troughs 12', 22', 32' are aligned with the second troughs 12", 22", 32".

The second peaks 11", 21", 31" preferably have the same features and relations among the features described for the first peaks 11', 21', 31'.

Each conductive track 1, 2, 3 is provided with two respective end portions 13', 13", 23', 23", 33', 33" (FIG. 1) which serve for the connection to an electronic control unit.

The sensor track 2 and the shielding track 3 preferably, but not exclusively, are adapted to be connected to a same electronic control unit, and the heating track 1 is adapted to be connected to another electronic control unit.

In alternative, the three tracks 1, 2, 3 may be connected to a same electronic control unit.

In any case, it is preferable for the electronic control unit to be adapted, in particular configured, to put the sensor track 2 and the shielding track 3 at the same electric potential.

Device 100 may optionally comprise said electronic control unit, or said electronic control units, connected to the tracks 1, 2, 3 as described above.

Device 100 is flexible. Device 100 in particular belongs to the field of flexible electronics and may also be called flexible circuit or "Flex Foil".

It is worth noting that device 100 in FIG. 1 is illustrated under a condition in which it is supported on a support plane. The three tracks 1, 2, 3 are substantially a same plane under this condition.

Figure 4:
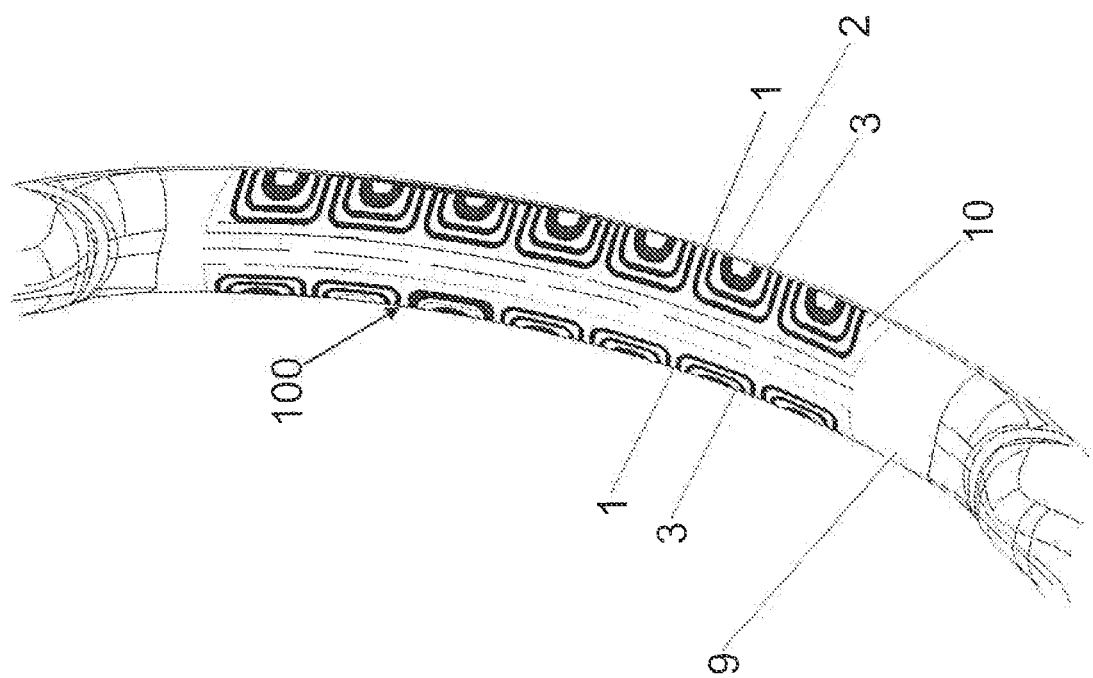
FIG. 4 shows a perspective view of a part of a steering wheel of a vehicle provided with a device according to the invention.

Since it is flexible, device 100 may also take on other shapes, such as for example, the shape shown in FIG. 4, where device 100 is arranged on the steering wheel 9 of a vehicle.

It is worth noting that support 10 is shown by mere way of example, it being understood that it may also have other shapes which are not shown, in particular according to the steering wheel 9 on which the device is intended to be arranged.

Moreover, it is to be clear that the shape of the tracks 1, 2, 3 is provided only by way of example.

Preferably, but not exclusively, the three tracks 1, 2, 3 are incorporated in the insulating support 10. For example, the tracks 1, 2, 3 are arranged between two layers of the insulating support 10 fastened to each other, substantially forming a sandwich structure.

One of the two layers of the insulating support 10 may be arranged on the body of the steering wheel 9. For example, one layer of support 10 may be arranged on the metal skeleton of the steering wheel or on another layer of the body of the steering wheel, for example a layer made of polyurethane or another element made of thermohardening plastic or thermoplastic of the body of the steering wheel. The other layer of the insulating support 10 may be covered with an outer covering layer of the steering wheel, made of leather for example.

In alternative, the tracks may be fastened to a surface, for example an outer face, of the insulating support 10.

In any case, it is preferable to provide an outer covering layer, made of leather for example, of the steering wheel, over the three tracks 1, 2, 3 and of device 100 in general, whereby the contact between the driver's hand or hands and the sensor track 2 is of the indirect type, in particular a capacitive coupling.

Device 100 preferably has an overall thickness between 0.1 and 1 mm, for example between 0.1 and 0.6 mm, or between 0.3 and 1 mm, or between 0.3 and 0.6 mm; for example, the thickness is equal to about 0.3 mm or is equal to about 0.6 mm.

The overall thickness of device 100 preferably is much smaller than the maximum length and the maximum width thereof. Such length and width preferably substantially correspond to the maximum length and the maximum width of the insulating support 10. For example, the length of device 100 along axis X may be between 900 and 1200 mm and the width may be between 80 and 160 mm, or between 80 and 100 mm. The dimensions of device 100 may in any case be selected according to the dimensions of any steering wheel on which it is provided for device 100 to be applied.

The material with which the insulating support 10 is made preferably is a polymeric material. By mere way of non-limiting example, the insulating support 10 may comprise or be made of silicone, PVC, PS, PP, PE, PC, ABS, PET, PA, PU, PUR, NBR, PTFE, EPDM and the like, optionally with additives. The insulating support preferably comprises or is made of PVC.

By mere way of non-limiting example, each conductive track 1, 2, 3 may comprise or be made of aluminum, costantan, copper, German silver, steel, Inconel, brass and the like. The conductive tracks 1, 2, 3 preferably are made of aluminum.

The conductive tracks preferably each have a thickness between 10 and 200 µm, for example between 15 and 150 µm.

By mere way of non-limiting example, device 100 may be made by means of etching a foil fastened to support 10, or by crosslinking a silicone support on which there are arranged one or more of the aforesaid conductive tracks obtained by means of cutting, e.g. laser cutting.

Device 100, support 10 in particular, preferably is extensible, it being plastically and/or elastically deformable, up to about 10-20% with respect to a resting configuration or initial configuration.

FIG. 4 shows a part of a steering wheel 9 of a vehicle provided with a device 100. Device 100 in particular is fastened to a surface of the steering wheel 9. As already mentioned, an outer covering layer (not shown) which covers device 100 may be provided over device 100. Such an outer covering layer preferably is made of leather.

By way of example, an operating method of a device 100 provides, during the electric supply to heat the heating track 1, for the shielding track 3 to shield the sensor track 2 so as to avoid the capacitive coupling between the heating track 1 and the sensor track 2, and it is optionally provided for the sensor track 2 and the shielding track 3 to be put at the same electric potential, in particular by means of the electronic control unit which is configured for this purpose, i.e. to carry out the aforesaid operation.

It is worth noting that, preferably, the end values of the intervals of values indicated in this description are included.

What is claimed is:

1. A heating and detecting device for detecting a contact between a user and a steering wheel of a vehicle and for heating the steering wheel, the heating and detecting device comprising:
    an electrically insulating support;
    a heating track for heating the steering wheel, a sensor track for detecting the contact, and a shielding track for avoiding a detection of false contacts between the user and the steering wheel;
    the heating track, the sensor track and the shielding track being electrically conductive, distinct from one another and arranged on a same surface of the electrically insulating support;
    wherein the shielding track is arranged between the heating track and the sensor track;
    wherein the shielding track is spaced apart both from the heating track and from the sensor track; and
    wherein the heating track, the sensor track and the shielding track are made of aluminum or constantan or copper or German silver or steel or Inconel metal or brass.

2. The heating and detecting device according to claim 1, wherein a minimum distance between the heating track and the sensor track is between 1.5 and 4 mm.

3. The heating and detecting device according to claim 1, wherein a minimum distance between the shielding track and the heating track is between 0.1 and 1.5 mm.

4. The heating and detecting device according to claim 1, wherein a minimum distance between the shielding track and the sensor track is between 0.1 and 1.5 mm.

5. The heating and detecting device according to claim 1, wherein the sensor track comprises a plurality of first peaks alternated by a plurality of first troughs.

6. The heating and detecting device according to claim 5, wherein the heating track and the shielding track each comprise a plurality of first peaks alternated by a plurality of first troughs.

7. The heating and detecting device according to claim 6, wherein the heating track, the sensor track and the shielding track each comprise a plurality of second peaks alternated by a plurality of second troughs along an axis.

8. The heating and detecting device according to claim 7, wherein the plurality of second peaks of the heating track, of the sensor track, and of the shielding track are aligned with one another.

9. The heating and detecting device according to claim 6, wherein the plurality of first peaks of the heating track, of the sensor track, and of the shielding track are aligned with one another.

10. The heating and detecting device according to claim 5, wherein a minimum distance between adjacent ones of the plurality of first peaks of the sensor track is between 10 and 18 mm.

11. The heating and detecting device according to claim 1, wherein an electronic control unit is provided, connected at least to the sensor track and to the shielding track, the electronic control unit being configured to adjust an electric potential of said sensor track and of said shielding track.

12. A steering wheel of a vehicle provided with at least one heating and detecting device according to claim 1.

13. A method of operating the heating and detecting device according to claim 1, wherein during an electric supply for heating the heating track, the shielding track shields the sensor track so as to avoid a capacitive coupling between the heating track and the sensor track, and optionally wherein the sensor track and the shielding track are arranged at a same electrical potential.

* * * * *